United States Patent [19]
Snoy

[11] 4,068,747
[45] Jan. 17, 1978

[54] MULTI-PLATE CLUTCH HAVING MEANS TO PREVENT PLATE FLUTTER

[75] Inventor: Joseph B. Snoy, Rockford, Ill.

[73] Assignee: Twin Disc, Incorporated, Racine, Wis.

[21] Appl. No.: 725,773

[22] Filed: Sept. 23, 1976

[51] Int. Cl.² ............................................. F16D 13/64
[52] U.S. Cl. ............................... 192/30 V; 192/70.14;
192/70.2; 192/107 R
[58] Field of Search ................. 192/30 V, 70.14, 70.2,
192/107 R; 188/71.1, 71.5, 218 A, 218 XL

[56] References Cited
U.S. PATENT DOCUMENTS

| 3,482,668 | 12/1969 | Hilpert | 192/107 R X |
| 3,486,588 | 12/1969 | Grego | 188/71.5 |
| 3,927,740 | 12/1975 | Zarembka | 192/70.2 X |

*Primary Examiner*—Allan D. Herrmann
*Attorney, Agent, or Firm*—James E. Nilles

[57] ABSTRACT

Means to prevent flutter of the interleaved clutch plates of a clutch including clutch plates having their peripheries formed as non-circular members. The outer periphery of the clutch plates are formed with flat portions or spots which act as cams when the adjacent discs rotate relative to each other and whereby they resist the tendency to flutter. The clutch plates are formed so that a continuous circular surface no longer exists on the periphery of the plates and in effect a series of cams are provided which tend to drive the clutch plate to a neutral or no-force position.

11 Claims, 3 Drawing Figures

MULTI-PLATE CLUTCH HAVING MEANS TO PREVENT PLATE FLUTTER

BACKGROUND OF THE INVENTION

Clutch flutter occurs in multi-plate clutches and this flutter can be very damaging to the clutch plates, due for one thing to the localized heat that is developed. In flutter of the clutch plates, the plates, whether they are internally splined or externally splined, are tipped over individually or in groups and they may stay locked in this skewed position due to the dynamic forces involved. Thus, they will act as a swash or wobble plate. The opposite set of plates are then also forced to wobble back and forth axially in or over their respective splines.

The problem of clutch plate flutter or wobble is discussed in several United States patents which have been assigned to an assignee common with the present invention, for example the Hilpert U.S. Pat. Nos. 3,472,348 which issued Oct. 14, 1969; 3,446,323 which issued May 27, 1969 and 3,482,668 which issued Dec. 9, 1969.

SUMMARY OF THE INVENTION

The present invention provides a multi-plate clutch having means formed on the periphery of the clutch plates which in effect act as cams when the adjacent plates rotate relative to one another and which act to break up the flutter so that the flutter forces cannot be sustained. The rotation of the adjacent discs having such interrupted peripheral surfaces, causes the periphery of the discs, which act as cams, to drive the plates to a neutral or no-force position. The invention also contemplates that the back plate portion of the clutch hub also has a series of flats formed around the periphery thereof so that those flats are driven against that clutch plate which is adjacent the back plate portion of the hub.

More specifically, the invention pertains to a multi-plate clutch having irregularly shaped outer peripheral surfaces on the clutch plates and in which the flats formed on the clutch plate periphery are odd in number and are of a different number in each set of plates. The purpose of this irregularity in number is to further deviate from the otherwise ideal swash plate condition.

Generally, the present invention provides a multi-plate clutch in which machine flats are formed on the outer diameter of the pertinent parts of the clutch members that rotate relative to each other whereby the flutter forces cannot be sustained to the point of plate failure.

These and other objects and advantages of the present invention will appear hereinafter as this disclosure progresses, reference being had to the accompanying drawings.

DESCRIPTION OF A PREFERRED EMBODIMENT

Figure 1:
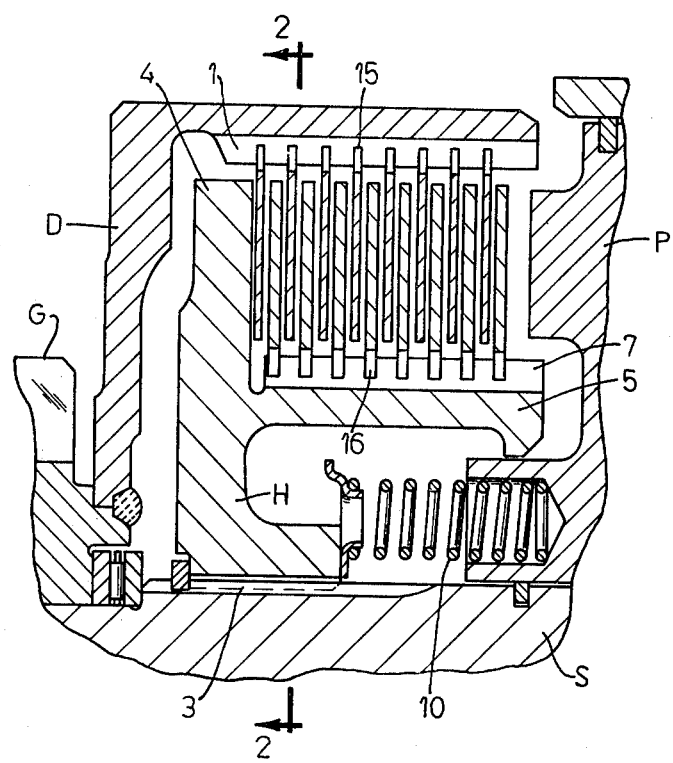
FIG. 1 is a longitudinal, fragmentary, cross sectional view through a multi-plate clutch, which embodies the present invention.
Figure 2:
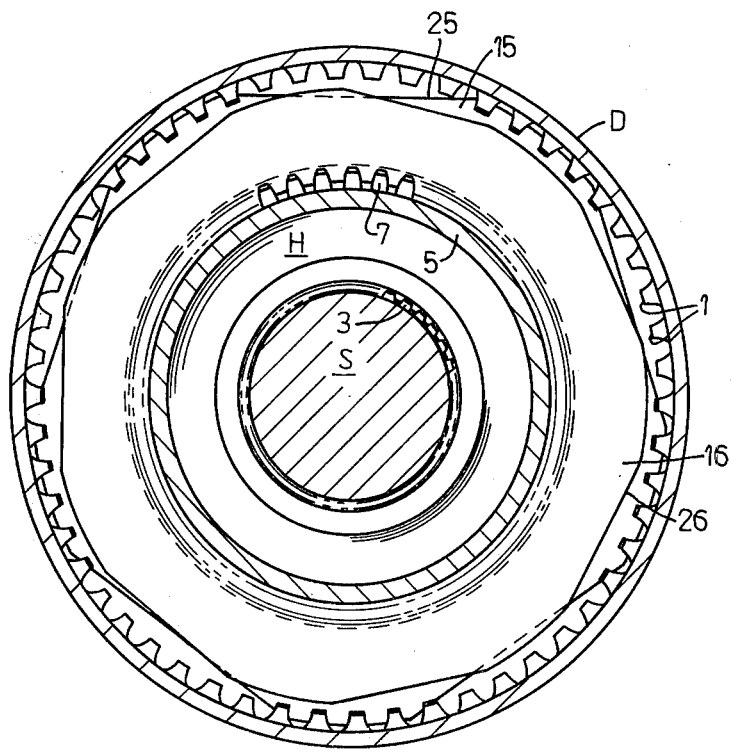
FIG. 2 is a transverse, cross sectional view taken generally along the line 2—2 in FIG. 1, on an enlarged scale.

In FIG. 1 only a portion of a clutch C has been shown, it being understood that the clutch is symmetrical about the axial centerline of the clutch. The clutch includes a gear member G to which is secured the clutch drum D having internal splines 1. Another clutch member in the form of a shaft S has a clutch hub H splined thereto as at 3. The clutch hub has a plate portion 4 and a hub portion 5, on the latter of which are formed axial splines 7. The clutch also includes a conventional, hydraulically actuated piston P which is adapted to be axially shiftable to engage the interleaved clutch plates 15 and 16 in the known manner. A spring 10 acts to push the piston P away from the clutch plates to insure their complete release and eliminate clutch drag when the clutch is not to be engaged.

The externally toothed plates 15 are adapted to be engaged in the internal spline 1 of the drum in the known manner. The other, interleaved clutch plates 16 have their teeth on their internal periphery and these teeth engage the axial spline 7 of the hub so as to be driven thereby, also in the known manner. The clutch is shown in FIG. 1 in the disengaged position where there is no driving force between the interleaved plates.

As explained in the above mentioned patents, very often the counter-rotating clutch plates tend to wobble or act as a swash plate, that is, one or the other of them or a group of them become skewed, that is to say they become non-normal to the axis of rotation. This skewing of a plate will ultimately cause adjacent plates to assume a skewed or wobbled position. This wobbling of the plates causes heat build-up and other detrimental effects, resulting in eventual failure of the clutch.

In accordance with the present invention, means have been provided on the outer periphery of the clutch elements, and which means prevent or break-up the wobbling action of the plates. Stated otherwise, the clutch plates 15 and 16 have flat portions 25 and 26 respectively formed around their periphery, thus providing a non-continuous circular outer surface of the clutch plates. Similarly, flat surfaces 24 are formed on the plate portion 4 of the hub so that the surfaces 24 and their intervening, partially circular portions 28 act as cam members for example, against the adjacent plate 15. Likewise, flat surfaces 26 of clutch plate 16 act against the adjacent plates 15 and as they are pressed against the adjacent plates, they cause the plates to bump or be interrupted, thus breaking up or eliminating the wobble rather than permitting the adjacent discs to continue to run smoothly against one another, for example if they had uninterrupted peripheral surfaces.

Figure 3:
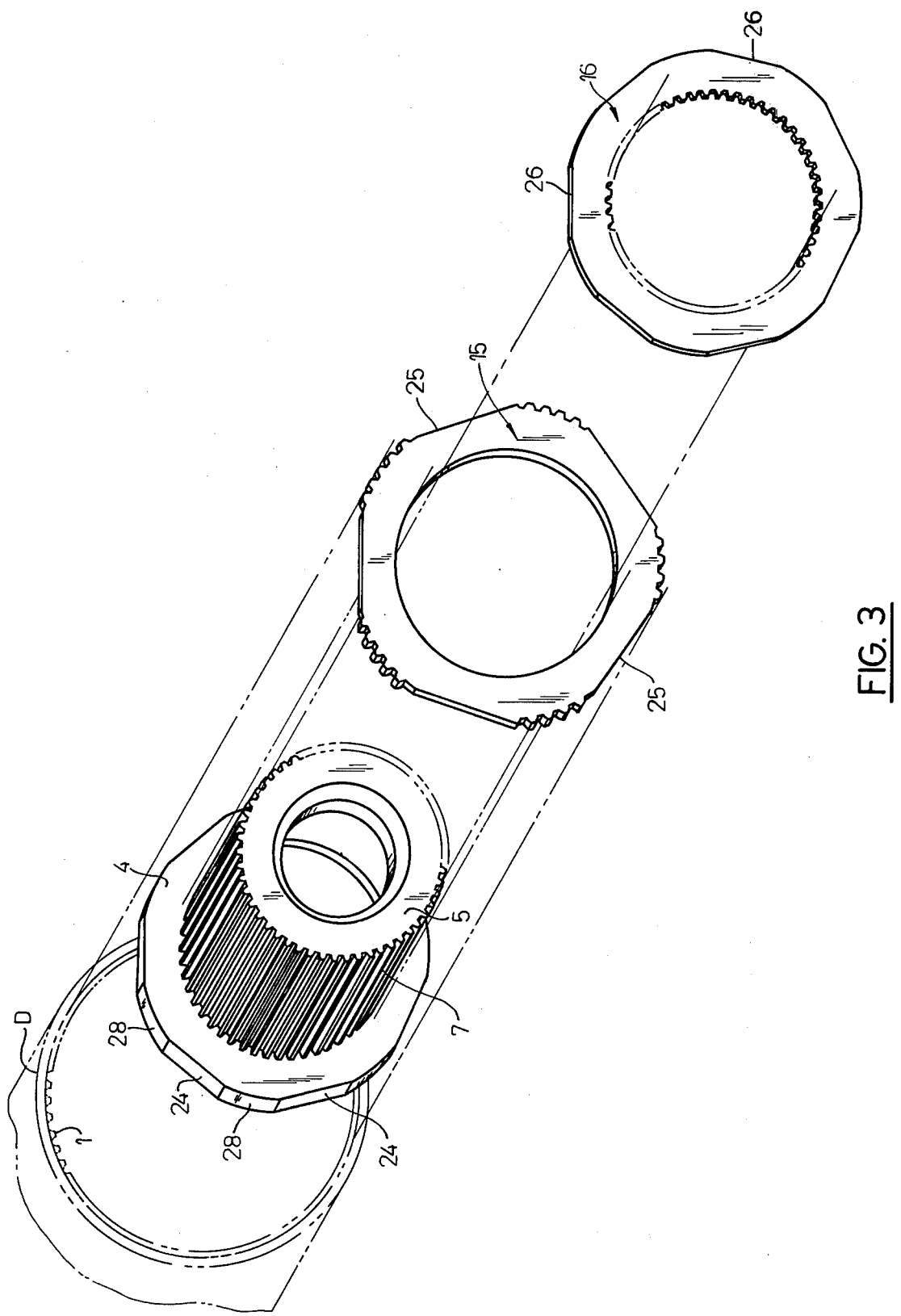
FIG. 3 is an exploded, perspective view of portions of the clutch shown in FIGS. 1 and 2.

As shown in FIG. 3, the externally toothed clutch plates 15 have an uneven number of flat surfaces 25 formed thereon, namely five in number. It will also be noted that the internally tooth clutch plates 16 have an uneven number of flat surfaces formed around their periphery, the number is different from, for example greater than, the number of flat surfaces on clutch 15, for example the plates 16 has seven flat surfaces around their periphery. The use of uneven number of flat surfaces and also the use of different numbers of flat surfaces between adjacent plates have been found to be particularly efficient in breaking up the wobble of the plates and preventing wobble from becoming established.

With the present invention, the outer peripheral surfaces of the plates do not form a continuous surface and instead the flat portions formed thereon act as a series of cams which tend to drive the plates to neutral or no-force position. The number of flats are odd in number and the different number in each set of plates is provided which further deviate from the ideal swash plate conditions that would otherwise exist. As these discs press against each other in rotating in opposition directions, they are caused to bump or be interrupted and are prevented from simply running smoothly against one another as they would otherwise do in a wobbling condition.

I claim:

1. In a multi-plate friction type clutch having interleaved clutch plates which can be axially clamped together for clutch engagement or released for clutch disengagement and in which said clutch plates have peripheral surfaces, means formed on the outer periphery of said plates so as to cause said outer peripheral surfaces to be of non-circular shape, a clutch hub having a splined portion on which some of said plates are splined, said hub also having a back plate portion, said back plate portion having a periphery, and irregular portions formed on said periphery for contact with an adjacent plate.

2. The clutch set forth in claim 1 further characterized in that said plates comprise externally splined plates and adjacent internally splined plates, and said means formed on said periphery are comprised of generally flat spots.

3. The clutch set forth in claim 2 further characterized in that said flat spots are of an odd number.

4. The clutch set forth in claim 3 further characterized in that the number of said flat spots on said externally splined plates are different from the number of flat spots on said internally splined plates.

5. A multi-plate friction type clutch having interleaved clutch plates which can be axially clamped together for clutch engagement or released for clutch disengagement, said clutch plates having peripheral surfaces, an odd number of flat spots formed on the outer periphery of said plates so as to cause said outer peripheral surfaces to be of non-circular shape and act as a series of cams between adjacent plates to prevent flutter of said plates, said plates comprise externally splined plates and adjacent internally splined plates, and the number of said flat spots on said externally splined plates are different from the number of flat spots on said internally splined plates.

6. The clutch set forth in claim 5 including a clutch hub having a splined portion on which some of said plates are splined, said hub also having a back plate portion, said back plate portion having a periphery, and irregular portions formed on said periphery for contact with an adjacent plate.

7. A multi-plate friction type clutch having interleaved clutch plates which can be axially clamped together for clutch engagement or released for clutch disengagement, said clutch plates having peripheral surfaces, a series of flat portions formed on the outer periphery of said plates so as to cause said outer peripheral surfaces to be of non-circular shape and tend to eliminate plate wobble as the peripheral surfaces are pressed against adjacent plates.

8. The clutch set forth in claim 7 including a clutch hub having a splined portion on which some of said plates are splined, said hub also having a back plate portion, said back plate portion having a periphery, and irregular portions formed on said periphery for contact with an adjacent plate.

9. The clutch set forth in claim 7 further characterized in that said plates comprise externally splined plates and adjacent internally splined plates, and said flat portions are of an odd number.

10. The clutch set forth in claim 9 further characterized in that the number of said flat portions on said externally splined plates are different from the number of flat portions on said internally splined plates.

11. The clutch set forth in claim 10 including a clutch hub having a spline portion on which some of said plates are splined, said hub also having a back plate portion, said back plate portion having a periphery, and irregular portions formed on said periphery for contact with an adjacent plate.

* * * * *